US012712200B2

(12) United States Patent
Leukel et al.

(10) Patent No.: US 12,712,200 B2
(45) Date of Patent: Aug. 18, 2026

(54) ALUMINUM-DOPED LITHIUM ION CONDUCTOR BASED ON A GARNET STRUCTURE

(71) Applicant: SCHOTT AG, Mainz (DE)

(72) Inventors: Sebastian Leukel, Mainz (DE); Meike Schneider, Taunusstein (DE); Andreas Roters, Mainz (DE); Jörg Schumacher, Kornwestheim (DE); Wolfgang Schmidbauer, Mainz Finthen (DE); Bernd Rüdinger, Wörrstadt (DE)

(73) Assignee: SCHOTT AG, Mainz (DE)

( * ) Notice: Subject to any disclaimer, the term of this patent is extended or adjusted under 35 U.S.C. 154(b) by 663 days.

(21) Appl. No.: 17/244,355

(22) Filed: Apr. 29, 2021

(65) Prior Publication Data

US 2021/0344039 A1 Nov. 4, 2021

(30) Foreign Application Priority Data

Apr. 29, 2020 (DE) ..................... 10 2020 111 624.1

(51) Int. Cl.

*H01M 10/0562* (2010.01)
*H01M 10/0525* (2010.01)
*H01M 50/434* (2021.01)

(52) U.S. Cl.

CPC ... *H01M 10/0562* (2013.01); *H01M 10/0525* (2013.01); *H01M 50/434* (2021.01); *H01M 2300/0071* (2013.01)

(58) Field of Classification Search

CPC ..... H01M 10/0562; H01M 2300/0071; H01M 10/0525; H01M 4/62; H01M 50/434;

(Continued)

(56) References Cited

U.S. PATENT DOCUMENTS 6,817,212 B1 11/2004 Roemer
2004/0196887 A1 10/2004 Schmidbauer (Continued)

FOREIGN PATENT DOCUMENTS

CN 102867986 1/2013
CN 105778915 7/2016

(Continued)

OTHER PUBLICATIONS

Shimonishi et al., "Synthesis of garnet-type Li7-xLa3Zr2O12-1/2x and its stability in aqueous solutions", Solid State Ionics, 183, pp. 48-53, published Jan. 21, 2011. (Year: 2011).*

(Continued)

*Primary Examiner* — Miriam Stagg
*Assistant Examiner* — Lilia Nedialkova
(74) *Attorney, Agent, or Firm* — Ruggiero McAllister & McMahon LLC

(57) ABSTRACT

An aluminum-doped lithium ion conductor based on a garnet structure includes an aluminum-doped lithium lanthanum zirconate (LLZO). The LLZO is co-doped with at least one trivalent M3+ ion on the lanthanum site. The trivalent M3+ ion has an ionic radius that is smaller than that of La3+ and a higher lithium content is present in comparison to a stoichiometric garnet structure. If M3+ is yttrium, a further trivalent M3+ ion, which is different than Y3+ and has an ionic radius that is smaller than that of La3+, is co-doped on the lanthanum site. Co-doping includes doping on the lanthanum site with ions of the same valence, but smaller diameter, causing a change in lattice geometry to a cubic form. This leads to a stabilization of the cubic crystal modification that is also present with superstoichiometric quantities of lithium.

15 Claims, 2 Drawing Sheets

(58) Field of Classification Search

CPC ... Y02E 60/10; C01G 25/006; C01P 2002/52; C01P 2004/61; C01P 2004/62; C03C 10/00; C03C 4/18; C04B 2235/3201; C04B 2235/3203; C04B 2235/3213; C04B 2235/3215; C04B 2235/3217; C04B 2235/3224; C04B 2235/3225; C04B 2235/3227; C04B 2235/3229; C04B 2235/3244; C04B 2235/3251; C04B 2235/3286; C04B 2235/3298; C04B 2235/36; C04B 2235/5436; C04B 2235/5445; C04B 2235/762; C04B 2235/764; C04B 2235/765; C04B 2235/80; C04B 35/01; C04B 35/486; C04B 35/653; H01G 11/28; H01G 11/48; H01G 11/50; H01G 11/68

See application file for complete search history.

(56) References Cited

U.S. PATENT DOCUMENTS

| | | | | |
|---|---|---|---|---|
| 2011/0244337 | A1 | 10/2011 | Ohta | |
| 2014/0295287 | A1 | 10/2014 | Eisele | |
| 2016/0268630 | A1 | 9/2016 | Tsukada | |
| 2016/0308244 | A1* | 10/2016 | Badding | H01M 10/0525 |
| 2016/0329598 | A1 | 11/2016 | Schneider | |
| 2017/0324079 | A1 | 11/2017 | Kataoka | |
| 2018/0013171 | A1 | 1/2018 | Sakamoto | |
| 2019/0006707 | A1 | 1/2019 | Sakamoto | |

FOREIGN PATENT DOCUMENTS

| | | |
|---|---|---|
| CN | 106129463 | 11/2016 |
| CN | 107732298 | 2/2018 |
| CN | 107768715 | 3/2018 |
| CN | 109888374 | 6/2019 |
| CN | 110128140 | 8/2019 |
| DE | 19939780 | 2/2001 |
| DE | 19939782 | 5/2001 |
| DE | 102011079401 | 1/2013 |
| DE | 102014100684 | 5/2017 |
| EP | 2159867 | 3/2010 |
| EP | 3459920 | 3/2019 |
| EP | 3518251 | 7/2019 |
| JP | 2012031025 | 2/2012 |
| JP | 2013134852 | 7/2013 |
| JP | 2013149493 | 8/2013 |
| JP | 2018195483 | 12/2018 |
| WO | 2016068040 | 5/2016 |
| WO | 2019055730 | 3/2019 |

OTHER PUBLICATIONS

Rangasamy, E, et al. "The role of Al and Li concentration on the formation of cubic garnet solid electrolyte of nominal composition Li7La3Zr2O12", Solid State Ionics, 206, pp. 28-21, published Nov. 17, 2011. (Year: 2011).*

Shannon, "Revised Effective Ionic Radii and Systematic Studies of Interatomic Distances in Halides and Chalcogenides", Acta Cryst. 32, 1976, pp. 751-767.

Gu, "Effects of penta- and trivalent dopants on structure and conductivity of Li7La3Zr2O12", Solid State Ionics, 274, 2015, pp. 100-105.

Ohta, "High lithium ionic conductivity in the garnet-type oxide Li7-xLa3(Zr2-xNbx)O12 (x = 0-2)", J. Power Sources, 196, 2011, pp. 3342-3345.

Rangasamy, "The role of Al and Li concentration on the formation of cubic garnet solid electrolyte of nominal composition Li7La3Zr2O12", Solid State Ionics, 206, 2012, pp. 28-32.

Ramakumar, "Structure and Li+ dynamics of Sb-doped Li7La3Zr2012 fast lithium ion conductors", Phys. Chem. Chem. Phys. 15, 2013, pp. 11327-11338.

Deviannapoorani, "Lithium ion transport properties of high conductive tellurium substituted Li7La3Zr2012 cubic ithium gamets", Journal of Power Sources, 240, 2013, pp. 18-25.

Wang, "High Ionic Conductivity Lithium Garnet Oxides of Li7-x La3Zr2-x Tax O12 Compositions", Electrochem. Solid-State Lett. 15, 2012, pp. 68-71.

Wu, "Gallium-Doped Li7La3Zr2O12 Garnet-Type Electrolytes with High Lithium-Ion Conductivity", ACS Appl. Mater. Interfaces, 9, 2017, pp. 1542-1552, Abstract.

Murugan, "Fast Lithium Ion Conduction in Garnet-Type $Li_7La_3Zr_2O_{12}$", Angew. Chem. Int. Ed. 46, 2007, 7778-7781.

Dhivya, "Li+ transport properties of W substituted $Li_7La_3Zr_2O_{12}$ cubic lithium garnets", AIP Advances, 3, 2013, 082115, 21 pages.

* cited by examiner

ALUMINUM-DOPED LITHIUM ION CONDUCTOR BASED ON A GARNET STRUCTURE

CROSS-REFERENCE TO RELATED APPLICATION

The present application claims the benefit of German Patent Application No. DE 10 2020 111 624.1, filed on Apr. 29, 2020, which is herein incorporated by reference.

SUMMARY OF THE DISCLOSURE

1. Field of the Disclosure

The present disclosure relates to an aluminum-doped lithium ion conductor based on a garnet structure, a method for its production, as well as use thereof.

2. Discussion of the Related Art

In battery technology in the last few years, battery systems based on lithium ions have become increasingly widespread. These are particularly characterized by their high energy density and expected long service life, so that more efficient battery configurations are possible. The high chemical reactivity and the small mass of the lithium ions as well as their high mobility play a central role here. There is thus great interest in the development of solid state lithium ion conductors.

In the case of solid state batteries or solid state rechargeable batteries, both electrodes and the electrolyte are composed of solid material. In lithium ion batteries or rechargeable batteries, lithium compounds are present in all three phases of the electrochemical cell. The batteries contain lithium ions in the negative electrode, the positive electrode, and the electrolyte. The general advantage of lithium-based solid state batteries or rechargeable batteries in this case is that a liquid electrolyte that is frequently readily combustible or toxic and has a tendency toward decomposition is replaced, and thus an improvement of safety and reliability of lithium-based batteries is possible.

Lithium ion conductors that crystallize in a garnet structure or garnet-like structure, which are also called lithium garnets, such as lithium lanthanum zirconate (LLZO), due to their high ion conductivity at room temperature, are promising materials for use as solid electrolytes in solid state lithium ion batteries or all solid state batteries (ASSB) (Murugan R., Thangadurai V., Weppner W., Fast lithium ion conduction in garnet-type $Li_7La_3Zr_2O_{12}$, Angew. Chem. Int. Ed. 46, 2007, 7778-7781).

However, there are many difficulties associated with making currently available LLZO materials, such as limitations on the types of processes that can be used and the materials that can be doped into the LLZO. The present disclosure addresses these problems.

SUMMARY OF THE DISCLOSURE

The present disclosure provides an aluminum-doped lithium ion conductor based on a garnet structure, in particular an LLZO, which has an excess of lithium present above a stoichiometric amount, but nevertheless provides a sufficient stability in the cubic modification, in particular a stability against thermal processes. The advantageous properties of the aluminum doping, such as, for example, a cost-effective use of aluminum and a stability against reduction in contact with lithium metal, shall be maintained. In addition, the aluminum-doped lithium ion conductor based on a garnet structure shall be producible by way of a melting method.

Accordingly, the present disclosure provides an aluminum-doped lithium ion conductor based on a garnet structure, comprising an aluminum-doped lithium lanthanum zirconate (LLZO). The LLZO is co-doped with at least one trivalent $M^{3+}$ ion on a lanthanum site, wherein the trivalent $M^{3+}$ ion has an ionic radius that is smaller than that of $La^{3+}$, and a higher lithium content is present in the conductor in comparison to a stoichiometric garnet structure. If $M^{3+}$ represents yttrium, a further trivalent $M^{3+}$ ion, which is different than $Y^{3+}$ and has an ionic radius that is smaller than that of $La^{3+}$, is co-doped on the lanthanum site.

DETAILED DESCRIPTION OF THE DISCLOSURE

Figure 1:
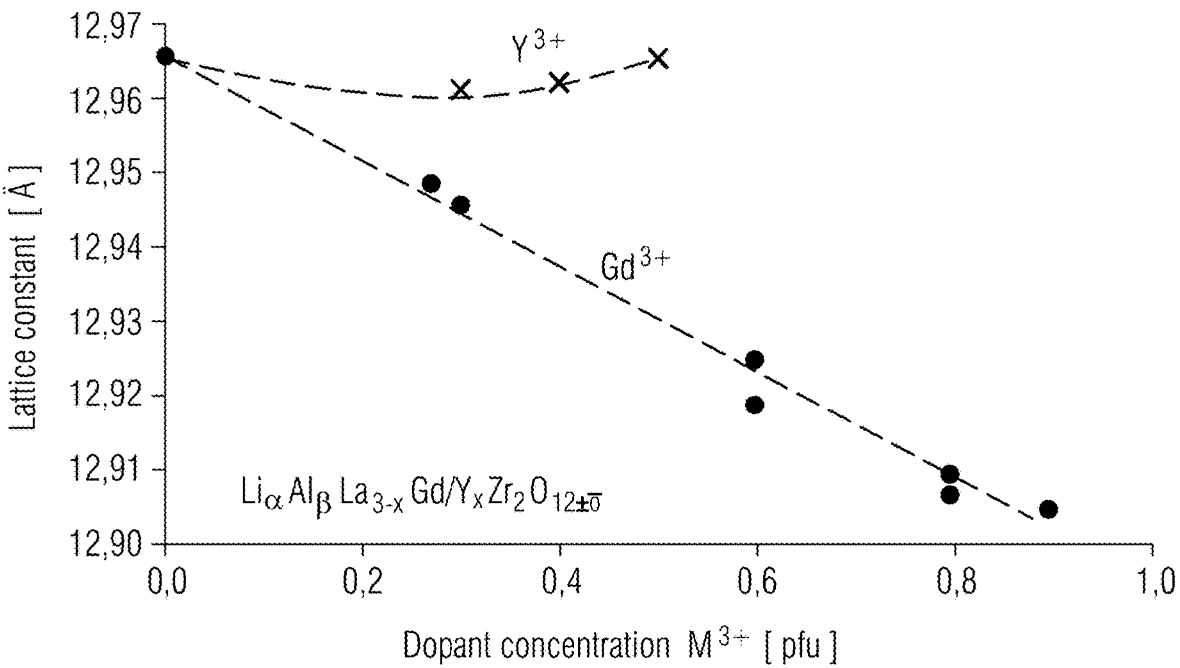
FIG. 1 shows the lattice constant of the cubic Al-doped lithium lanthanum zirconate (LLZO) modification as a function of the dopant concentration of gadolinium (Gd) and yttrium (Y).

In a surprising way, it was established that the above object is achieved by an aluminum-doped lithium ion conductor based on a garnet structure comprising lanthanum, in particular an aluminum-doped lithium lanthanum zirconate (LLZO), wherein the latter is co-doped with at least one trivalent $M^{3+}$ ion on the lanthanum site, wherein the trivalent $M^{3+}$ ion has an ionic radius that is smaller than that of $La^{3+}$, and a higher lithium content (superstoichiometric lithium content) is present in comparison to a stoichiometric garnet structure, with the provision that if $M^{3+}$ represents yttrium, an additional trivalent $M^{3+}$ ion, which is different than $Y^{3+}$ and has an ionic radius that is smaller than that of $La^{3+}$, is co-doped on the lanthanum site.

According to a preferred embodiment, the present disclosure thus relates to an aluminum-doped lithium ion conductor having the general chemical formula:

$$Li_{7-3x+y'+2y''-z'-2z''+u}Al_x^{3+}La_{3-y-y'-y''}M_y^{3+}M_{y'}^{2+}M_{y''}^{1+}Zr_{2-z-z'-z''}M_z^{4+}M_{z'}^{5+}M_{z''}^{6+}O_{12\pm\delta} \quad (I)$$

wherein $M^{3+}$: represents one or more trivalent cations with an ionic radius smaller than $La^{3+}$, with the exception of $Al^{3+}$, $M^{2+}$: represents one or more divalent cations, $M^{1+}$: represents one or more monovalent cations, with the exception of $Li^+$, $M^{4+}$: represents one or more tetravalent cations, with the exception of $Zr^{4+}$, $M^{5+}$: represents one or more pentavalent cations, $M^{6+}$: represents one or more hexavalent cations, $0.1 \le x < 1$, $0 < y < 2$, $0 \le y' < 0.2$, $0 \le y'' < 0.2$, $0 \le y' + y'' < 0.2$, $0 \le z < 0.5$, $0 \le Z' < 0.8$, $0 \le z'' < 0.5$, $0 \leq \delta < 2$, and wherein $u > 0$ for a superstoichiometric lithium content, preferably $u \geq 0.2$, with the provision that if $M^{3+}$ represents yttrium, an additional trivalent $M^{3+}$ ion, which is different than $Y^{3+}$ and has an ionic radius that is smaller than that of $La^{3+}$, is co-doped on the lanthanum site.

The general chemical formula (I) given above involves an aluminum-doped lithium lanthanum zirconate (LLZO).

The term "based on a garnet structure" means that the known basic structure is present each time, wherein deviations from the basic structure known from the prior art may exist. These can be, for example, in addition, dopings with other elements that are known from the prior art. The term comprises all compounds falling under the general heading of garnet structure or garnet-like structure.

As used in the present disclosure, $0.1 \leq x$ means x=0.1 and $0.1 < x$, wherein $0.1 < x$ preferably means values for x that are 0.11 or greater; and $x < 1$ preferably means values for x that are 0.99 or smaller.

$0 < y$ preferably means values for y that are 0.001 or higher and $y < 2$ preferably means values for y that are 1.99 or less.

$0 \leq y'$ means $y'=0$ and $0 < y'$, wherein $0 < y'$ preferably means values for y' that are 0.01 or higher; and $y' < 0.2$ preferably means values for y' that are 0.19 or less.

$0 \leq y''$ means $y''=0$ and $0 < y''$, wherein $0 < y''$ preferably means values for y'' that are 0.01 or higher; and $y'' < 0.2$ preferably means values for y'' that are 0.19 or less.

$0 \leq y'+y''$ means $y'+y''=0$ and $0 < y'+y''$, wherein $0 < y'+y''$ preferably means values for y'+y'' that are 0.01 or higher; and $y'+y'' < 0.2$ preferably means values for y'+y'' that are 0.19 or less.

$0 \leq z$ means z=0 and $0 < z$, wherein $0 < z$ preferably means values for z that are 0.01 or higher; and $z < 0.5$ preferably means values for z that are 0.49 or less.

$0 \leq z'$ means $z'=0$ and $0 < z'$, wherein $0 < z'$ preferably means values for z' that are 0.01 or higher; and $z' < 0.8$ preferably means values for z' that are 0.79 or less.

$0 \leq z''$ means $z''=0$ and $0 < z''$, wherein $0 < z''$ preferably means values for z'' that are 0.01 or higher; and $z'' < 0.5$ preferably means values for z'' that are 0.49 or less.

$u > 0$ preferably means values for u that are 0.01 or higher.

$u \geq 0.2$ means u=0.2 and $u > 0.2$, wherein $u > 0.2$ preferably means values for u that are 0.21 or higher.

According to one embodiment, the aluminum-doped lithium lanthanum zirconate (LLZO) according to the above chemical formula (I) has a lithium content that is higher in comparison to a stoichiometric garnet structure and that lies at $u > 0$, preferably $u \geq 0.2$. A stoichiometric lithium content would be present for u=0. The latter is determined by the quantity of $Al^{3+}$ and $M^{1+}$, $M^{2+}$, $M^{5+}$ and $M^{6+}$: $Li_{7-3x+y'+2y''-z'-2z''}$. A stoichiometric lithium content in the aluminum-doped lithium ion conductor, preferably lithium lanthanum zirconate (LLZO) is not desired according to the disclosure and is thus excluded.

It has been found that it is advantageous if the quantity x of aluminum amounts to $0.1 \leq x < 1$, referred to one formula unit of the lithium lanthanum zirconate (LLZO), preferably $0.14 \leq x < 1$, referred to one formula unit of the lithium lanthanum zirconate (LLZO), in formula (I), in order to obtain sufficient lithium vacancies (Vu) for stabilizing the cubic modification of doped lithium lanthanum zirconate (LLZO) at room temperature. The following also is particularly preferred: $0.1 \leq x < 0.5$, and still more preferred is $0.14 \leq x < 0.5$.

In order to simplify and for better understanding, in the present application, the lithium lanthanum zirconate (LLZO) is usually drawn on as a representative example for explaining an aluminum-doped lithium ion conductor. It is understood, however, that embodiments for any other aluminum-doped garnet-based lithium ion conductors shall be valid in the same way. In the following, the aluminum-doped, garnet-based lithium ion conductor is also simply called just a lithium ion conductor or aluminum-doped lithium ion conductor.

The numerical or quantitative data for the individual components of the lithium ion conductor that are specified without units are understood as [pfu], i.e., atoms per formula unit of the aluminum-doped lithium ion conductor, in particular of the aluminum-doped lithium lanthanum zirconate (LLZO).

The super-valent doping of an aluminum-doped lithium ion conductor, in particular of lithium lanthanum zirconate (LLZO), i.e., a doping with ions that have a higher valence than the ion to be replaced is of great importance for generating lithium vacancies, which finally lead to the stabilizing of the cubic modification with higher ion conductivity at room temperature.

According to the disclosure, a super-valent doping with aluminum is present on the lithium site ($Li^+ \rightarrow Al^{3+} + 2\ V_{Li}$; two Li vacancies are generated per $Al^{3+}$). As already mentioned, the doping with aluminum is of advantage in comparison to niobium, based on the low cost of raw materials, in particular in comparison to tantalum or gallium, as well as due to the good redox stability. However, unlike in the doping with tantalum or niobium, the doping with aluminum takes place directly on the lithium site, an exact balancing of the lithium-aluminum ratio is necessary in order to obtain the correct phase. An increase in the lithium content would lead to the fact that the dopant aluminum would be partially displaced again from the crystal structure, so that the cubic lithium lanthanum zirconate (LLZO) would no longer be stabilized sufficiently at room temperature. A simple increase in the lithium content by using a larger quantity of lithium initial component thus is out of the question.

This circumstance is particularly critical, since an increased lithium content is desirable in order to compensate for the vaporization of $Li_2O$ at the high synthesis temperatures, on the one hand, (independent of the production process: reactive sintering, sol-gel, spray pyrolysis, melt), and, on the other hand, to improve the sintering properties of the material (Rangasamy E. et al., 2012, loc.cit.). In the production of lithium lanthanum zirconate (LLZO) by a melting process, the phase composition reacts in a particularly sensitive manner to a change in the aluminum-lithium ratio. Even a slight change in the lithium content, such as may occur for fluctuations in production, leads to a massive shift in the phase content relating to the undesired tetragonal lithium lanthanum zirconate (LLZO). This is also shown in the examples for the present disclosure.

The present disclosure solves this problem of lithium sensitivity of the aluminum-doped lithium ion conductor, in particular aluminum-doped lithium lanthanum zirconate (LLZO) by a specific co-doping strategy for the aluminum-doped lithium ion conductor, which stabilizes the cubic phase against a higher lithium content, in particular a superstoichiometric lithium content.

The co-doping strategy according to the disclosure comprises the doping of an aluminum-doped lithium ion conductor, in particular an aluminum-doped lithium lanthanum zirconate (LLZO), with one or more trivalent $M^{3+}$ cations on the lanthanum site, whose ionic radius according to Shannon (Shannon, R. D., Revised effective ionic radii and systematic studies of interatomic distances in halides and chalcogenides, *Acta Cryst.* 32, 1976, 751-767) is smaller than the ionic radius of the $La^{3+}$ cation.

The use of trivalent cations of the lanthanides as $M^{3+}$ is preferred; these correspond to the named condition for the ionic radius, i.e., the group composed of cerium, praseodymium, neodymium, promethium, samarium, europium, gadolinium, terbium, dysprosium, holmium, erbium, thulium, ytterbium and lutetium. Actinides, such as for example, thorium and protactinium, could also be used, since they satisfy the condition of a smaller ionic radius than $La^{3+}$. Based on their radioactivity, however, one should refrain from using them. Also, other trivalent cations, which fulfill the requirement that they have a smaller ionic radius than $La^{3+}$, such as, for example, yttrium, scandium, bismuth and indium, can be used. Most preferred is the combination of gadolinium and yttrium. However, the disclosure is not limited thereto.

The presence of yttrium alone as trivalent $M^{3+}$ cation is generally excluded in the present disclosure, since it does not achieve the object according to the disclosure. It has been found that the use of yttrium alone as $M^{3+}$ does not display the desired stabilization, since the quantity of $Y^{3+}$ necessary for stabilization is not fully introduced on the lanthanum site. With increasing yttrium content, the formation of undesired secondary phases sharply increases (see FIG. 2 of the present disclosure and the explanations therefor). As will be described in detail, with the use of yttrium in comparison to gadolinium, FIG. 1 shows a deviation of the lattice parameter from Vegard's Law (linear relationship between degree of doping and lattice parameter). This behavior should probably be attributed to the binding structure of the yttrium that is different in comparison to the binding structure of the lanthanides, which is characterized by the absence of f-orbitals in the case of yttrium. Therefore, if $M^{3+}$ is yttrium, an additional trivalent $M^{3+}$ ion that has an ionic radius that is smaller than that of $La^{3+}$ and that is different than $Y^{3+}$ must be co-doped on the lanthanum site.

If yttrium should be present in the aluminum-doped lithium ion conductor, it is particularly advantageous if yttrium is used in a quantity such that $Y^3+<0.2$ per formula unit of the aluminum-doped lithium ion conductor. The stabilization of the cubic phase can be promoted in this way.

Of the trivalent cations of the lanthanides as $M^{3+}$, gadolinium is particularly preferred. Thus, the use of at least 0.1 mol of gadolinium as trivalent cation per formula unit of the aluminum-doped lithium ion conductor, in particular aluminum-doped lithium lanthanum zirconate (LLZO) is particularly advantageous. In other words, in the above formula (I), the trivalent $M^{3+}$ cation is particularly preferred to be gadolinium and the following is then valid for y: $y>0.1$ [pfu]. Then, $y=0.11$ or greater is particularly preferred. Aluminum is especially well stabilized as dopant in the garnet structure, whereby the cubic phase remains also in the case of a lithium excess.

In another particularly preferred embodiment, a combination of $Gd^{3+}$ and $Y^{3+}$ is present for $M^{3+}$ in the aluminum-doped lithium ion conductor, and the following preferably applies: $Y^3+<0.2$ per formula unit of the aluminum-doped lithium ion conductor and $Gd^3+>0.1$ per formula unit of the aluminum-doped lithium ion conductor.

For the use of the described ion-conducting lithium lanthanum zirconate (LLZO) as electrolyte in a battery with a lithium anode, it is preferred if the trivalent $M^{3+}$ cations that are used for the doping on the lanthanum site are not polyvalent. In other words, $M^{3+}$ ions, which may have a valence other than trivalent, such as, for example, $Ce^{3+}/Ce^{4+}$, are thus preferably not used for $M^{3+}$ in the present disclosure when a lithium anode is present in a battery to be used. Also, other anode materials may reduce polyvalent cations.

The selection of the dopants for the lanthanum based on their smaller ionic radius is a completely novel concept and it follows a completely different approach than in the entire prior art. The procedure known from the prior art is aliovalent doping (doping with ions of a different valence (e.g., $Zr^{4+} \rightarrow Ta^{5+}+Vu$ or $Zr^{4+} \rightarrow Y^{3+}+Li^{+}$) in order to influence the lithium vacancy concentration (Vu). In contrast to this, according to the present disclosure, an isovalent doping (doping with ions of the same valence) is carried out with a smaller trivalent cation ($M^{3+}$ for $La^{3+}$), wherein the lithium vacancy concentration (Vu) is not directly influenced, but is stabilized by the change in the lattice geometry of the aliovalent dopant aluminum that is present in the crystal structure. This can also be referred to as "second-order doping". Therefore, unlike what is usual in the prior art, instead of the lithium vacancy concentration (Vu), influence is brought to bear directly on the lattice geometry.

Since $Al^{3+}$ and $Li^{+}$ compete for the same lattice sites, with a superstoichiometric lithium content, aluminum is displaced from the lithium lanthanum zirconate (LLZO) structure. The desired cubic modification is no longer sufficiently stabilized thereby and tetragonal lithium lanthanum zirconate (LLZO) is partially formed. This is also shown and substantiated in the examples for the present disclosure.

Due to the partial replacement of $La^{3+}$ by one or more trivalent $M^{3+}$ cations, whose ionic radius is smaller than that of $La^{3+}$, the unit cell of the lithium lanthanum zirconate (LLZO) structure shrinks (see also FIG. 1). Since the $Al^{3+}$ cation with an ionic radius according to Shannon (Shannon, R. D., 1976, loc. cit.) of 67.5 pm in octahedral coordination or 53.5 pm in tetrahedral coordination is smaller than the $Li^{+}$ cation with an ionic radius according to Shannon (Shannon, R. D., 1976, loc. cit.) of 90 pm in octahedral coordination or 76 pm in tetrahedral coordination, the incorporation of $Al^{3+}$ is promoted in the case of a smaller unit cell. It is thus preferred that the lattice constant a of the cubic lithium lanthanum zirconate (LLZO) modification is smaller than 12.965 Å. Preferably, this means 12.964 Å or smaller. Due to this stabilization of $Al^{3+}$ in the lithium lanthanum zirconate (LLZO) structure, in a surprising way, superstoichiometric quantities of lithium are also now possible without forming tetragonal lithium lanthanum zirconate (LLZO).

This effect is stronger, the more $La^{3+}$ is replaced by one or more trivalent $M^{3+}$ cations, whose ionic radius is smaller than that of $La^{3+}$. However, with too great a degree of doping, undesired, poorly ion-conducting secondary phases may occur, for which reason, the quantity y of $M^{3+}$ in formula (I) is limited to $0<y<2$, referred to one formula unit of the aluminum-doped lithium lanthanum zirconate (LLZO).

In addition, a small portion of the $La^{3+}$ can be optionally replaced by one or more divalent $M^{2+}$ cations and one or more monovalent $M^{1+}$ cations. In this way, the number of lithium vacancies is reduced and tetragonal lithium lanthanum zirconate (LLZO) can form. Therefore, too high a percentage of $M^{2+}$ and $M^{1+}$ on the lanthanum site should be avoided, and the sum of the monovalent and divalent cations $M^{2+}$ and $M^{1+}$ is limited to $<0.2$.

In order to increase the lithium vacancy concentration, in addition to the super-valent doping with aluminum on the lithium site, zirconium can also be partially replaced by one or more pentavalent $M^{5+}$ cations or one or more hexavalent $M^{6+}$ cations. In this case, the quantity z' of pentavalent cations should be smaller than 0.8, the quantity of hexavalent cations z" should be less than 0.5, each time referred to one formula unit of the aluminum-doped lithium lanthanum zirconate (LLZO). Too many vacancies in the lithium sublattice can lead to a reduction in conductivity as well as promote the formation of foreign phases (e.g., pyrochlore). Also, zirconium can be partially replaced by other tetravalent $M^{4+}$ cations. This occurs, e.g., due to the contamination of Zr raw materials with $Hf^{4+}$. Doping can take place also in a targeted manner with tetravalent cations, such as $Si^{4+}$ and $Ge^{4+}$, on the zircon site, in order to influence, for example, the sintering properties of the material. However, this does not influence the lithium vacancy concentration.

The co-doping strategy according to the disclosure comprises a combination both of super-valent doping with aluminum on the lithium site as well as isovalent doping with one or more trivalent $M^{3+}$ cations on the lanthanum site, the ionic radius of these trivalent $M^{3+}$ cations being smaller than that of $La^{3+}$; and optionally with one or more monovalent $M^{1+}$ cations and optionally with one or more divalent $M^{2+}$ cations on the lanthanum site; as well as optionally with one or more tetravalent $M^{4+}$ cations, with optionally one or more pentavalent $M^{5+}$ cations, and optionally with one or more hexavalent $M^{6+}$ cations on the zirconium site. In this way, aluminum-doped lithium lanthanum zirconate (LLZO) with superstoichiometric lithium content is obtained and the stability and preference for the cubic modification is assured.

The co-doping strategy according to the disclosure provides the use of trivalent $M^{3+}$ cations, the ionic radius of which is smaller than that of the $La^{3+}$, as isovalent dopant on the lanthanum site. An aliovalent doping with $M^{3+}$ on the zirconium site ($Zr^{4+} \rightarrow M^{3+}+Li^{+}$) opposes the generation of lithium vacancies and is thus not desired. Therefore, a ratio preferably of $(La^{3+}+M^{3+}+M^{2+}+M^{1+})/(Zr^{4+}+M^{6+}+M^{5+}+M^{4+}+M^{3+})<1.5$, preferably $(La^{3+}+M^{3+}+M^{2+}+M^{1+})/(Zr^{4+}+M^{6+}+M^{5+}+M^{4+}+M^{3+})<1.35$, is adjusted. In this ratio, $M^{3+}$ is always present and is not 0. $M^{1+}$, $M^{2+}$, $M^{4+}$, $M^{5+}$ and $M^{6+}$ that are optionally present and in each case may also be 0. Preferably, the ratio of $(La^{3+}+M^{3+}+M^{2+}+M^{1+})/(Zr^{4+}+M^{6+}+M^{5+}+M^{4+}+M^{3+})$ can lie in the range of 1.49 to 1.0, more preferably in the range of 1.35 to 1.0. In the examples, values and a sample calculation for this ratio are specified. The ratio is therefore adjusted to the specified value in order to avoid the formation of foreign phases in a doping on the lanthanum site.

A melting method is the preferred method for the production of large quantities of the ion-conductive garnet. Sol-gel reactions and spray pyrolysis are disadvantageous, because these consume large quantities of solvent. Also, a reactive sintering, i.e., a heating below the melting point of the initial components, is disadvantageous, since, due to the large surface, a strongly corrosive $Li_2O$ atmosphere is produced, which attacks the oven material and contact materials.

When a melting method is used for the production, it should be taken into consideration that lithium-containing melts are very aggressive, so that a melting cannot be carried out in platinum or platinum-rhodium crucibles. A melting in a platinum crucible leads to an attack on the crucible material, and, in the produced product, to clearly detectable quantities of the precious metal. This results in turn in a clear percentage of electronic conductivity via precious metals, which acts overall in a detrimental manner.

The production by melting down and homogenizing is thus preferably carried out in an inductively heated skull crucible, by which means the above-mentioned disadvantages will be avoided.

Another possibility for production by melting technology is the use of a vitreous carbon crucible. Since these crucibles become oxidized in oxygen-containing atmospheres at the required high temperatures, the production must take place under a protective gas atmosphere (nitrogen or argon). This mode of production therefore makes sense only for smaller amounts; it would be disadvantageous, however, for large-scale production, since it is associated with additional costs.

The disclosure therefore also relates to a method for producing an aluminum-doped lithium ion conductor, wherein the production is carried out with the use of a melting method, preferably in a skull crucible.

A skull crucible is constructed from a plurality of metal pipes through which coolant flows, with slot-like intermediate spaces between the metal pipes, and with an induction coil surrounding the metal pipes from outside, wherein the metal pipes are preferably short-circuited together. For the production by way of a melting method, for example, by melting and homogenizing the initial materials with the use of a skull crucible and cooling of the melt, either by direct solidifying or a targeted, controlled cooling, or by quenching, followed by a temperature treatment (ceramicizing treatment), refer to DE 199 39 780 A1, DE 199 39 782 C1 and DE 10 2014 100 684 A1, the complete disclosure of which shall be incorporated into the present disclosure here by reference.

Aluminum-doped lithium ion conductors, in particular an aluminum-doped lithium lanthanum zirconate (LLZO) that is or are produced via a melting method, is or are characterized in that in addition to the crystalline ion-conducting garnet, an amorphous phase in which lithium and/or aluminum and/or $M^{3+}$ are enriched may also be present. This has the advantage that the softening point or melting point of this amorphous phase is lower than that of the lithium lanthanum zirconate (LLZO), for which reason the sintering properties are improved. This means, for example, lower sintering temperatures and denser sintering.

The subject of the disclosure is also a powder composed of the aluminum-doped lithium ion conductor according to the present disclosure, which has a particle size in the range of $d_{50}=0.1$ μm to 30 μm. The particle size was determined by a laser particle-size analyzer (CILAS).

In addition, the present disclosure relates to a sintered aluminum-doped lithium ion conductor, preferably produced with the use of the above-mentioned powder, wherein the sintered aluminum-doped lithium ion conductor has a lithium ion conductivity of more than $10^{-5}$ S/cm.

In addition, the present disclosure relates to the use of the aluminum-doped lithium ion conductor, preferably in the form of a powder, in batteries or rechargeable batteries, preferably lithium batteries or lithium rechargeable batteries, in particular separators, cathodes, anodes, or solid electrolytes.

The aluminum-doped lithium ion conductor according to the disclosure, preferably in the form of lithium ion conducting powder materials, alone or together with additional battery materials, for example, sintered into a purely inorganic, ceramic membrane, or as electrolyte, incorporated as a filler in a polymer electrolyte or in polyelectrolytes, in rechargeable lithium ion batteries, in particular in solid-state lithium ion batteries (all-solid-state batteries (ASSB)). On the one hand, use as a separator is possible in this case: Introduced between the electrodes, it protects them from an undesired short circuit and in this way assures the functionality of the entire system. To do this, the corresponding composite can either be introduced as a layer onto one or both electrodes or it can be integrated into the battery as a free-standing membrane, as a solid-state electrolyte. On the other hand, a co-sintering or compounding with the electrode materials is possible. In this case, the solid-state electrolyte accomplishes the transport back and forth of the relevant charge carriers (lithium ions and electrons) to the electrode materials and to the conducting electrodes, each time depending on whether the battery is being directly charged or discharged.

As additional applications of the material according to the disclosure, use in gas sensors and as ion-selective membranes in chemical processes is also conceivable.

The advantages of the present disclosure are many. In a surprising way, it was established that the cubic modification of an aluminum-doped lithium ion conductor based on a garnet structure, preferably an aluminum-doped lithium lanthanum zirconate (LLZO), is then obtained particularly when co-doping takes place with at least one trivalent $M^{3+}$ ion on the lanthanum site, wherein the trivalent $M^{3+}$ ion has an ionic radius that is smaller than that of $La^{3+}$, with the provision that the trivalent $M^{3+}$ ion does not represent only yttrium. Doping only with aluminum on the lithium site is not sufficient for stabilization of the cubic modification in the case of a superstoichiometric lithium content, so that a sufficient stabilization of the cubic modification is obtained only in combination with an isovalent doping with one or more trivalent $M^{3+}$ cations, the ionic radius of which is smaller than that of $La^{3+}$, on the lanthanum site. Only the cubic modification leads to a desired high conductivity of more than $10^{-5}$ S/cm.

The doping of the lithium ion conductor with aluminum based on a garnet structure is of advantage due to the low costs for raw materials as well as the known good redox stability in comparison to other elements. In addition, the doping of aluminum on the lithium site leads to an increased number of lithium vacancies (two Li vacancies are generated per $Al^{3+}$).

Furthermore, in comparison to a stoichiometric garnet structure, a higher lithium content is possible in the aluminum-doped lithium ion conductor based on a garnet structure. This is particularly advantageous, since an increased lithium content, on the one hand compensates for the vaporization of $Li_2O$ in the case of the high temperatures during the production, and, on the other hand, the sintering properties of the material are improved.

Optionally, one or more additional monovalent $M^{1+}$ cations (except for $Li^+$) and one or more divalent $M^{2+}$ cations can be doped on the lanthanum site. However, this reduces the lithium vacancy concentration. Therefore, the sum of the monovalent $M^{1+}$ cations (except for $Li^+$) and divalent $M^{2+}$ cations is limited to less than 0.2, referred to one formula unit of the aluminum-doped lithium lanthanum zirconate (LLZO). The advantage of the use of monovalent $M^{1+}$ cations (except for $Li^+$) and also divalent $M^{2+}$ cations is that the sintering properties can be improved thereby.

With the use of monovalent ions, except for lithium, preferably those ions are used that have a lesser mobility than the lithium ion, thus, e.g., $K^+$ or $Cs^+$, in order not to adversely affect the use as lithium ion conductors in batteries.

With the use of divalent ions, preferably those ions that are not polyvalent are used, thus, e.g., alkaline-earth cations, in order not to adversely affect the use as lithium ion conductors in batteries.

Optionally, in addition, one or more pentavalent $M^{5+}$ cations and one or more hexavalent $M^{6+}$ cations can also be doped on the zirconium site, to increase the lithium vacancy concentration. Also, a portion of the $Zr^{4+}$ cations can be replaced by one or more tetravalent $M^{4+}$ cations, such as $Si^{4+}$ and $Ge^{4+}$. However, the lithium vacancy concentration remains uninfluenced by this.

Preferably, lanthanides and combinations of lanthanides and other trivalent cations that fulfill the requirement that they have an ionic radius that is smaller than $La^{3+}$ are used for the trivalent $M^{3+}$ cations. Most preferred is gadolinium and the combination of gadolinium and other trivalent cations that fulfill the requirement that they have an ionic radius that is smaller than $La^{3+}$, for example yttrium.

The use of gadolinium as trivalent cation is particularly preferred, wherein at least 0.1 mol of gadolinium per formula unit of the aluminum-doped lithium ion conductor, in particular aluminum-doped lithium lanthanum zirconate (LLZO) is preferably present. In chemical formula (I), y would then be >0.1 for $Gd^{3+}$, and preferably y would be 0.11 or greater. This is particularly advantageous since aluminum is especially well stabilized as dopant thereby in the garnet structure, whereby the cubic phase remains also in the case of a lithium excess.

With use of the described lithium ion conductor as electrolyte in a battery with a lithium anode, it is preferred if the trivalent $M^{3+}$ cations that are used for the doping on the lanthanum site are not polyvalent, i.e., they can only exist as trivalent. Also, other anode materials may reduce polyvalent cations.

Therefore, according to the disclosure, a concept that is completely different than that in the prior art is realized. Instead of the usual doping with ions of different valence with direct influence on the number of lithium vacancies (Vu), according to the disclosure, a combination of aliovalent doping and isovalent doping will be carried out, wherein a doping on the lanthanum site with ions of the same valence, but smaller diameter, brings about the change in the lattice geometry in the desired direction. This "doping of the second order" leads to a reduction in the unit cell of the lithium lanthanum zirconate (LLZO) structure, which promotes the incorporation of $Al^{3+}$ on the lithium site. The more that $La^{3+}$ is replaced by one or more trivalent $M^{3+}$ cations with smaller ionic radius, the clearer the effect becomes. This replacement can be limited, however, due to the formation of disadvantageous secondary phases. The quantity y of $M^{3+}$ in formula (I) is thus limited to $0<y<2$, referred to one formula unit of the aluminum-doped lithium lanthanum zirconate (LLZO).

This is successfully carried out by adjusting the lattice constant a in a targeted manner by the selected percentage of smaller $M^{3+}$ cations; i.e., preferably a<12.965 Å, so that the cubic modification is obtained. This stabilization of $Al^{3+}$ makes possible, in an unexpected way, the use of superstoichiometric quantities of lithium without the tetragonal modification being formed.

The stability of the cubic phase is further improved by the co-doping with a smaller ion on the lanthanum site during a thermal post-treatment. The formation of undesired secondary phases is not observed.

It is particularly preferred that a ratio of $(La^{3+}+M^{3+}+M^{2+}+M^{1+})/(Zr^{4+}+M^{6+}+M^{5+}+M^{4+}+M^{3+})<1.5$ is adjusted, whereby, with a doping on the lanthanum site, the formation of foreign phases can be avoided.

Preferably, the aluminum-doped lithium ion conductor according to the disclosure, in comparison to a stoichiometric garnet structure, has a higher lithium content and a ratio of cubic to tetragonal crystal phase of >90% to <10% (e.g., 90.1% or more of cubic crystal modification to 9.9% or less of tetragonal crystal modification), preferably >95% to <5% (e.g., 95.1% or more of cubic crystal modification to 4.9% or less of tetragonal crystal modification), particularly preferred >98% to <2% (e.g., 98.1% or more of cubic crystal modification to 1.9% or less of tetragonal crystal modification).

The production of the lithium ion conductor of the present disclosure preferably takes place via a melting method. In general, solvents can be avoided in this way. The use of a skull crucible for the production is thereby preferred. An aluminum-doped lithium ion conductor produced via a melting method, the conductor being based on a garnet structure, in particular an aluminum-doped lithium lanthanum zirconate (LLZO) advantageously has, in addition to the crystalline ion-conducting garnet, an amorphous phase in which lithium and/or aluminum and/or $M^{3+}$ are enriched.

In FIG. 1, the lattice constant in [Å] of the cubic, Al-doped lithium lanthanum zirconate (LLZO) modification (y-axis) is plotted against the dopant concentration in [pfu] of gadolinium (Gd) and yttrium (Y) (x-axis). The lattice constant decreases linearly with the replacement of $La^{3+}$ by the smaller $Gd^{3+}$ ion (Vegard's Law). The deviant behavior in the case of the yttrium doping shows that the desired reduction in the lattice constant due to yttrium alone cannot be reliably achieved.

Figure 2:
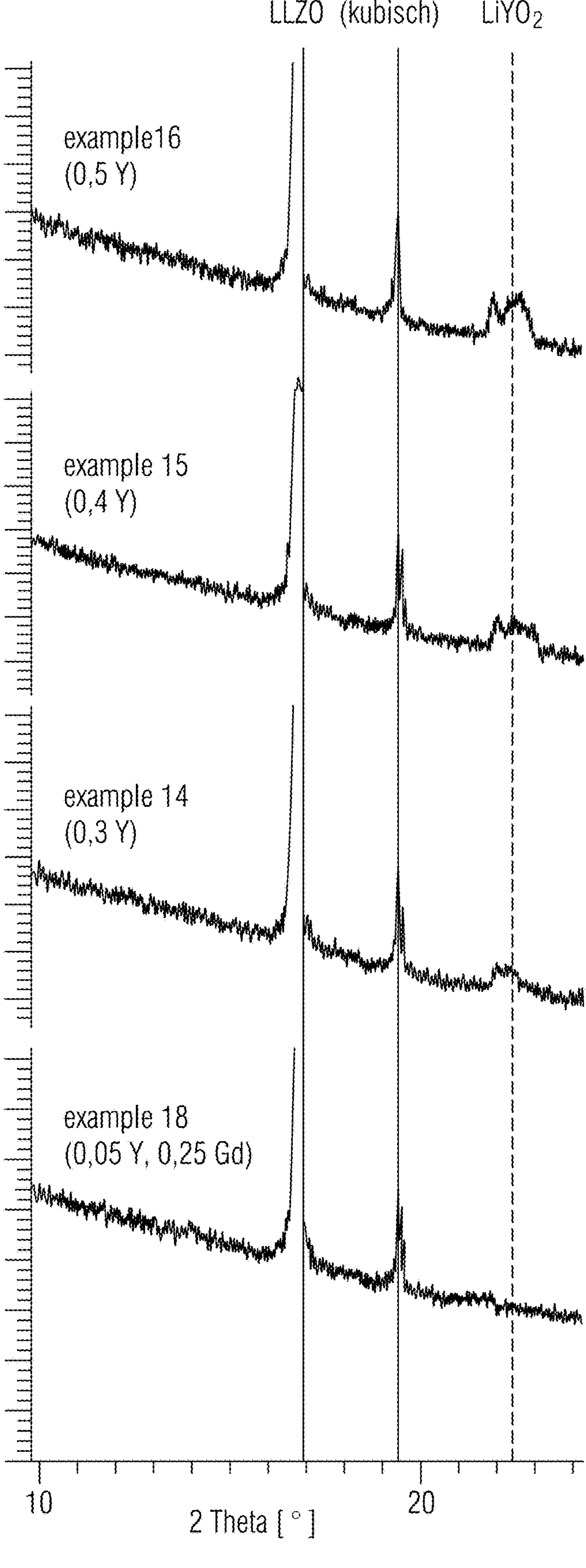
FIG. 2 shows excerpts, arranged one above the other, of x-ray diffraction (XRD) diffractograms of Examples 14, 15, 16 and 18.

In order to investigate the yttrium doping in detail, for structural clarification, XRD x-ray diffractograms were taken of the compositions according to Examples 14, 15, 16 and 18. In FIG. 2, excerpts of 4 XRD x-ray diffractograms of each of Examples 14, 15, 16 and 18 are now shown arranged one above the other. The compositions of the Examples are specified in Table 1. The XRDs show the increase in the foreign phase $LiYO_2$ with increasing yttrium content in the Examples 14, 15, and 16. The excerpts of XRDs that are shown with small scattering angles make it clear that with increasing yttrium content, in addition to the desired cubic LLZO modification (solid lines), an undesired secondary phase (dashed lines)—that was identified as $LiYO_2$—also is found to be increased. In the case of co-doping of $Gd^{3+}$ with small quantities of $Y^{3+}$ (Example 18), the formation of this secondary phase is not observed.

Therefore, FIG. 1 shows that gadolinium (Gd), for example, is particularly well suitable for doping on the lanthanum site. Other elements with smaller ionic radius than the $La^{3+}$ ion, such as the lanthanides, for example, lead to comparably advantageous results. The lattice constant can be successfully adjusted to the desired value in this way, whereby a stabilization of the Al-doped lithium lanthanum zirconate (LLZO) in the cubic modification is obtained in a targeted manner. In contrast thereto, FIGS. 1 and 2 show that yttrium alone is not suitable for this purpose, and thus, the use of yttrium alone was excluded from the teaching according to the disclosure.

The present disclosure will be explained in more detail below on the basis of examples, but without limitation thereto.

Exemplary Embodiments

Examples of compositions with the percentage of lithium lanthanum zirconate (LLZO) in the cubic modification, referred to the total quantity of lithium lanthanum zirconate (LLZO) are specified in Table 1 below. The composition is specified as atoms per formula unit (pfu) of the aluminum-doped lithium lanthanum zirconate (LLZO). The percentage of lithium lanthanum zirconate (LLZO) in the cubic modification was determined from the XRD data by Rietveld analysis and is given as:

$$LLZO_{cubic}/LLZO_{tetragonal}+LLZO_{cubic},$$

wherein the analysis was produced in wt. %.

TABLE 1

| Ex. | $Li^+$ | $Al^{3+}$ | $La^{3+}$ | $Gd^{3+}$ | $Y^{3+}$ | $Zr^{4+}$ | $Hf^{4+}$ | $Si^{4+}$ | $Ta^{5+}$ | $Ba^{2+}$ | $Sr^{2+}$ | $K^+$ | $(La^{3+} + M^{3+} + M^{2+} + M^{1+}))/(Zr^{4+} + M^{6+} + M^{5+} + M^{4+} + M^{3+})$ | Percentage of cubic LLZO [wt. %] | Conductivity [S/cm] |
|---|---|---|---|---|---|---|---|---|---|---|---|---|---|---|---|
| 1* | 6.4 | 0.2 | 3 | | | 2 | | | | | | | 1.50 | 100.0 | 1.4E−04 |
| 2* | 6.4 | 0.2 | 3 | | | 1.96 | | | 0.04 | | | | 1.50 | 100.0 | 8.9E−05 |
| 3* | 6.6 | 0.2 | 3 | | | 2 | | | | | | | 1.50 | 70.1 | 8.4E−05 |
| 4* | 6.6 | 0.2 | 2.8 | | | 2 | | | | | 0.2 | | 1.50 | 29.5 | 3.0E−5 |
| 5* | 6.4 | 0.2 | 2.2 | 0.8 | | 2 | | | | | | | 1.07 | 100.0 | 2.8E−05 |
| 6* | 6.4 | 0.2 | 2.73 | 0.27 | | 2 | | | | | | | 1.32 | 100.0 | 8.8E−05 |
| 7* | 6.4 | 0.2 | 2.4 | 0.6 | | 2 | | | | | | | 1.15 | 100.0 | 4.2E−05 |
| 8 | 6.8 | 0.2 | 2.4 | 0.6 | | 2 | | | | | | | 1.15 | 100.0 | 9.0E−05 |
| 9 | 7.6 | 0.2 | 2.2 | 0.8 | | 2 | | | | | | | 1.07 | 100.0 | 6.4E−05 |
| 10 | 7.2 | 0.2 | 2.1 | 0.9 | | 2 | | | | | | | 1.03 | 100.0 | 7.8E−05 |
| 11 | 6.8 | 0.4 | 2.7 | 0.3 | | 2 | | | | | | | 1.30 | 100.0 | 6.3E−5 |
| 12 | 7.2 | 0.4 | 2.7 | 0.3 | | 1.97 | | 0.03 | | | | | 1.30 | 100.0 | 1.0E−04 |
| 13* | 7.2 | 0.15 | 2.8 | | 0.2 | 2 | | | | | | | 1.36 | 40.0 | 3.8E−05 |
| 14* | 6.8 | 0.2 | 2.7 | | 0.3 | 2 | | | | | | | 1.30 | 100.0 | 1.0E−04 |
| 15* | 7 | 0.2 | 2.6 | | 0.4 | 2 | | | | | | | 1.25 | 100.0 | 1.2E−04 |
| 16* | 7 | 0.2 | 2.5 | | 0.5 | 2 | | | | | | | 1.20 | 100.0 | 1.0E−04 |
| 17 | 7 | 0.2 | 2.7 | 0.25 | 0.05 | 1.99 | | 0.01 | | | | | 1.30 | 100.0 | 7.9E−5 |
| 18 | 6.7 | 0.2 | 2.7 | 0.25 | 0.05 | 2 | | | | | | | 1.30 | 100.0 | 2.5E−4 |
| 19 | 7 | 0.3 | 2.7 | 0.25 | 0.05 | 2 | | | | | | | 1.30 | 100.0 | 1.5E−4 |
| 20 | 6.7 | 0.15 | 2.7 | 0.25 | 0.05 | 1.98 | 0.02 | | | | | | 1.30 | 100.0 | 1.5E−4 |
| 21 | 6.7 | 0.2 | 2.68 | 0.25 | 0.05 | 1.99 | | 0.01 | | 0.02 | | | 1.30 | 100.0 | n.d. |
| 22 | 7.5 | 0.4 | 2.60 | 0.3 | 0.05 | 1.97 | | 0.03 | | | | 0.05 | 1.28 | 100.0 | 5.3E−5 |

*Examples not according to the disclosure

Examples 8 to 12 and 17 to 22 are according to the disclosure.

Exemplary compositions and the corresponding percentage of lithium lanthanum zirconate (LLZO) in the cubic modification (determined by Rietveld analysis of the XRD data, referred to the total percentage of lithium lanthanum zirconate (LLZO)) are shown in Table 1. Examples 1 to 7 and 13 to 16 are not according to the disclosure. In Examples 1 to 4, the lanthanum site is not co-doped by another smaller trivalent $M^{3+}$ cation. In Examples 5 to 7, the lithium is present in stoichiometric quantity. In Examples 13 to 16, co-doping is carried out with yttrium alone, whereby the doping with yttrium alone as $M^{3+}$ is excluded according to the disclosure, since in small quantity, it cannot ensure the stabilization of the cubic modification (Example 13), or in higher concentration, in fact, even though the cubic modification is stabilized, at the same time, the formation of undesired secondary phases is brought about (Examples 14-16 or FIG. 2).

The raw materials were mixed corresponding to the compositions according to Table 1 and filled into a skull crucible open at the top. The mixture had to be pre-heated first in order to obtain a certain minimum conductivity. A burner heating was used for this purpose. After reaching the coupling temperature, the further heating and homogenizing of the melt were achieved by high-frequency coupling via an induction coil. In order to improve the homogenizing of the melts, stirring was conducted with a water-cooled stirring device. After complete homogenization, direct samples were removed from the melt (rapid cooling), while the remainder of the melt was slowly cooled by switching off the high frequency.

The material produced in this way can be converted into a glass-ceramic material with garnet-like primary crystal phase either by direct solidification from the melt or by quenching, followed by a temperature treatment (ceramicizing). The samples removed directly from the melt, independently of how they were cooled, showed a spontaneous crystallization, so that a downstream ceramicizing treatment could be dispensed with. Samples were produced from the thus-obtained glass ceramics for impedance spectroscopy to determine the conductivity, as well as for X-ray diffraction (XRD) investigations. In order to avoid a degradation of the samples upon contact with water, the sample preparation was conducted in an anhydrous manner.

The ratio of $(La^{3+}+M^{3+}+M^{2+}+M^{1+})/(Zr^{4+}+M^{6+}+M^{5+}+M^{4+}+M^{3+})<1.5$ is fulfilled in Examples 5 to 22, whereby, however, only Examples 8 to 12 and 17 to 22 are according to the present disclosure. In further detail, the ratio is calculated as follows: This shall be explained explicitly based in Example 11:

$La^{3+}$=2.7 pfu $M^{3+}$: Gd=0.3 pfu $Zr^{4}$+=2 pfu $M^{6+}$, $M^{5+}$, $M^{4+}$, $M^{2+}$, $M^{1+}$ is not present; therefore, $M^{6+}=M^{5+}=M^{4+}=M^{2+}=M^{1+}=0$ pfu This then results: (2.7 pfu+0.3 pfu+0 pfu+0 pfu)/(2 pfu+0 pfu+0 pfu+0 pfu+0.3 pfu)=(3 pfu)/(2.3 pfu)=1.30.

The following explanations can be given for the above Examples 1 to 22.

The stoichiometric lithium lanthanum zirconate (LLZO) composition in Example 1 leads to the formation of 100% cubic lithium lanthanum zirconate (LLZO). In this case, Example 2 shows that with additional doping with a pentavalent cation on the Zr site, the cubic structure remains. However, a small increase in the lithium content (from 6.4 to 6.6 pfu) has already had as a consequence a decrease in the content of cubic lithium lanthanum zirconate (LLZO) to 70.1 wt. % (see Example 3). Therefore, the explained effects occur, according to which an increased Li content would lead to the fact that the dopant aluminum is partially displaced again from the crystal structure, so that the cubic lithium lanthanum zirconate (LLZO) is no longer stabilized sufficiently at room temperature.

The addition of divalent $M^{2+}$ cations with a stoichiometric lithium content already leads to the formation of the undesired tetragonal modification (see Example 4).

Examples 5 to 12 are compositions with gadolinium and aluminum doping. In the case of stoichiometric composition (Examples 5 to 7), the cubic modification is obtained, independent of the quantity of gadolinium.

However, based on an isovalent co-doping on the lanthanum site, as shown in Examples 8 to 12 according to the present disclosure, due to the gadolinium co-doping, it is now possible in an unexpected way to also obtain the cubic modification with a superstoichiometric lithium content.

The aluminum content can be varied (Examples 11 and 12), and also doping can be conducted additionally on the zirconium site without obtaining the undesired tetragonal modification of the lithium lanthanum zirconate (LLZO).

Examples 13-16 are compositions with yttrium and aluminum doping. If the quantity of yttrium is too small (Example 13), cubic lithium lanthanum zirconate (LLZO) is only partially obtained. With higher yttrium content, the effect is also shown here that, despite superstoichiometric Li content, the cubic modification of lithium lanthanum zirconate (LLZO) is obtained (Examples 14 to 16). However, with these yttrium contents, the formation of undesired secondary phases increases (see FIG. 2).

Examples 17 to 20 are compositions with gadolinium, yttrium, and aluminum doping. In all of these examples, despite the superstoichiometric Li content, the cubic modification of lithium lanthanum zirconate (LLZO) is obtained. Due to the lower yttrium content, no undesired secondary phases occur (see FIG. 2). In this case, both the lithium content (see Examples 17 and 18) as well as the aluminum content (see Examples 17 and 19) can be varied without forming the tetragonal modification of the lithium lanthanum zirconate (LLZO), despite the superstoichiometric Li content. Also, small quantities of zirconium may be substituted (Examples 17 and 20).

Examples 21 and 22 are compositions with gadolinium (or gadolinium and yttrium) and aluminum doping, and which additionally contain small quantities of divalent $M^{2+}$ cations (Example 21) and monovalent $M^{1+}$ cations (Example 22) on the lanthanum site. Such co-dopings with subvalent cations lead to the formation of the undesired tetragonal modification of the lithium lanthanum zirconate (LLZO) in the case of aluminum-doped lithium lanthanum zirconate (LLZO), even with stoichiometric lithium content (Example 4). By co-doping with gadolinium or gadolinium and yttrium on the lanthanum site, the formation of the undesired tetragonal modification, in an unexpected way, does not occur any longer.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. An aluminum-doped lithium ion conductor based on a garnet structure, comprising:

an aluminum-doped lithium lanthanum zirconate (LLZO) co-doped on a lanthanum site with $Y^{3+}$ and at least one other trivalent cation having an ionic radius that is smaller than that of $La^{3+}$, with the exception of $Al^{3+}$, wherein the conductor has a lithium content that is superstoichiometric in comparison to a stoichiometric garnet structure, wherein the conductor has 90.1% or more of cubic crystal modification and 9.9% or less of tetragonal crystal modification, wherein the conductor has a lattice constant of a <12.965 Å, wherein the conductor has the chemical formula:

$$Li_{7-3x+y'+2y''-z'-2z''+u}Al_x^{3+}La_{3-y-y'-y''}M_y^{3+}M_{y'}^{2+}M_{y''}^{1+}Zr_{2-z-z'-z''}M_z^{4+}M_{z'}^{5+}M_{z''}^{6+}O_{12\pm\delta} \quad (I)$$

in which:

$M^{3+}$ includes $Y^{3+}$ and the at least one other trivalent cation having an ionic radius smaller than $La^{3+}$, with the exception of $Al^{3+}$, $M^{2+}$ represents one or more divalent cations, $M^{1+}$ represents one or more monovalent cations, with the exception of Lit, $M^{4+}$ represents one or more tetravalent cations, with the exception of $Zr^{4+}$, $M^{5+}$ represents one or more pentavalent cations, $M^{6+}$ represents one or more hexavalent cations, $0.1 \le x < 1$, $0 < y < 2$, $0 \le y' < 0.2$, $0 \le y'' < 0.2$, $0 \le y' + y'' < 0.2$, $0 \le z < 0.5$, $0 \le z' < 0.8$, $0 \le z'' < 0.5$, $0 \le \delta < 2$, and wherein $u > 0.01$ for a superstoichiometric lithium content.

2. The aluminum-doped lithium ion conductor according to claim 1, wherein the following applies: $0.1 \le x < 0.5$, with reference to one formula unit of the aluminum-doped lithium ion conductor based on a garnet structure in formula (I).

3. The aluminum-doped lithium ion conductor according to claim 1, wherein the quantity of $Y^{3+}$ is <0.2 per formula unit of the aluminum-doped lithium ion conductor based on a garnet structure.

4. The aluminum-doped lithium ion conductor according to claim 1, further comprising:

a ratio for the content of cations per formula unit in chemical formula (I) given by $(La+M^{3+}+M^{2+}+M^{1+})/(Zr+M^{6+}+M^{5+}+M^{4+}+M^{3+})$ greater than 1 and less than 1.5.

5. The aluminum-doped lithium ion conductor according to claim 4, wherein the content of each of $M^{6+}$, $M^{5+}$, $M^{4+}$, $M^{2+}$, and $M^{1+}$ is zero.

6. The aluminum-doped lithium ion conductor according to claim 1, further comprising:

a ratio for the content of cations per formula unit in chemical formula (I) given by $(La+M^{3+}+M^{2+}+M^{1+})/(Zr+M^{6+}+M^{5+}+M^{4+}+M^{3+})$ in the decreasing range of 1.49 to 1.0.

7. The aluminum-doped lithium ion conductor according to claim 1, wherein the at least one other trivalent cation is selected from the group consisting of: cerium, praseodymium, neodymium, promethium, samarium, europium, gadolinium, terbium, dysprosium, holmium, erbium, thulium, ytterbium, lutetium, scandium, bismuth, and indium.

8. The aluminum-doped lithium ion conductor according to claim 1, wherein the at least one other trivalent cation is gadolinium and at least 0.1 mol of gadolinium is present per formula unit of the aluminum-doped lithium ion conductor based on a garnet structure.

9. The aluminum-doped lithium ion conductor according to claim 1, wherein the at least one other trivalent cation is not polyvalent.

10. The aluminum-doped lithium ion conductor according to claim 1, wherein the conductor has an amorphous phase, in which at least one selected from the group consisting of: lithium, aluminum, and $M^{3+}$ is enriched.

11. The aluminum-doped lithium ion conductor according to claim 1, wherein the aluminum-doped lithium ion conductor has 95% or more of cubic crystal modification and 5% or less of tetragonal crystal modification.

12. A powder composed of the aluminum-doped lithium ion conductor according to claim 1, having a particle size in the range of $d_{50}$=0.1 μm to 30 μm.

13. The aluminum-doped lithium ion conductor according to claim 1, wherein the aluminum-doped lithium ion conductor is sintered and has an ion conductivity of more than $10^{-5}$ S/cm.

14. The aluminum-doped lithium ion conductor according to claim 1, wherein the aluminum-doped lithium ion conductor has 98% or more of cubic crystal modification and 2% or less of tetragonal crystal.

15. A method for producing an aluminum-doped lithium ion conductor, the method comprising:

melting initial materials in a skull crucible to form a melt; and cooling the melt to form the conductor, wherein the conductor is based on a garnet structure and comprises an aluminum-doped lithium lanthanum zirconate (LLZO) co-doped on a lanthanum site with $Y^{3+}$ and at least one other trivalent cation having an ionic radius that is smaller than that of $La^{3+}$, with the exception of $Al^{3+}$, wherein the conductor has a lithium content that is superstoichiometric in comparison to a stoichiometric garnet structure, wherein the conductor has 90.1% or more of cubic crystal modification and 9.9% or less of tetragonal crystal modification, wherein the conductor has a lattice constant of a <12.965 Å, wherein the conductor has the chemical formula:

$$Li_{7-3x+y'+2y''-z'-2z''+u}Al_x^{3+}La_{3-y-y'-y''}M_y^{3+}M_{y'}^{2+}M_{y''}^{1+}Zr_{2-z-z'-z''}M_z^{4+}M_{z'}^{5+}M_{z''}^{6+}O_{12\pm\delta} \quad (I)$$

in which:

$M^{3+}$ includes $Y^{3+}$ and the at least one other trivalent cation having an ionic radius smaller than $La^{3+}$, with the exception of $Al^{3+}$, $M^{2+}$ represents one or more divalent cations, $M^{1+}$ represents one or more monovalent cations, with the exception of $Li^{+}$, $M^{4+}$ represents one or more tetravalent cations, with the exception of $Zr^{4+}$, $M^{5+}$ represents one or more pentavalent cations, $M^{6+}$ represents one or more hexavalent cations, $0.1 \le x < 1$, $0 < y < 2$, $0 \le y' < 0.2$, $0 \le y'' < 0.2$, $0 \le y' + y'' < 0.2$, $0 \le z < 0.5$, $0 \le z' < 0.8$, $0 \le z'' < 0.5$, $0 \le \delta < 2$, and wherein $u > 0.01$ for a superstoichiometric lithium content.

* * * * *